US012776657B2

(12) United States Patent
Tong

(10) Patent No.: US 12,776,657 B2
(45) Date of Patent: Oct. 27, 2026

(54) POWER SUPPLY APPARATUSES

(71) Applicant: Totex Limited, Hong Kong (CN)

(72) Inventor: Yui Lung Tong, Hong Kong (CN)

(73) Assignee: Totex Limited, Hong Kong (CN)

( * ) Notice: Subject to any disclaimer, the term of this patent is extended or adjusted under 35 U.S.C. 154(b) by 981 days.

(21) Appl. No.: 18/011,534

(22) PCT Filed: Jun. 29, 2021

(86) PCT No.: PCT/IB2021/055797
§ 371 (c)(1),
(2) Date: Dec. 20, 2022

(87) PCT Pub. No.: WO2022/003553
PCT Pub. Date: Jan. 6, 2022

(65) Prior Publication Data

US 2024/0006902 A1 Jan. 4, 2024

(30) Foreign Application Priority Data

Jun. 29, 2020 (HK) .......................... 22020010130.5
Apr. 30, 2021 (HK) .......................... 32021030220.6

(51) Int. Cl.
*H02J 7/00* (2026.01)
*H02J 105/37* (2026.01)

(52) U.S. Cl.
CPC .............. *H02J 7/865* (2026.01); *H02J 7/855* (2026.01); *H02J 2105/37* (2026.01); *H02J 2207/20* (2020.01)

(58) Field of Classification Search
CPC ..................................................... H02J 7/0068
(Continued)

(56) References Cited

U.S. PATENT DOCUMENTS 10,611,253 B2 * 4/2020 Croset ..................... B60L 53/53
2006/0187689 A1 8/2006 Hartular
(Continued)

FOREIGN PATENT DOCUMENTS

DE 10247523 A 4/2004
DE 10247523 A1 * 4/2004 ........... H02J 7/1438
(Continued)

OTHER PUBLICATIONS

European Search Report of European Patent Application No. EP21831557.0 issued on Nov. 24, 2023.
(Continued)

*Primary Examiner* — Yalkew Fantu

(57) ABSTRACT

A power supply apparatus comprising a battery apparatus, the battery apparatus comprising a power input, a power converter (140) having an input side and an output side, a battery assembly (120), a switching arrangement, and a power output connected to the output side of the power converter (140) is disclosed. The switch arrangement is operable to connect the battery assembly (120) to the input side or to the output side of the power converter (140). The switch arrangement is configured to switch the apparatus to one of a plurality of connection states. The plurality of connection states includes a connection state in which the battery assembly (120) is connected to the input side of the power converter (140) and another connection state in which the battery assembly (120) is connected to the output side of the power converter (140).

20 Claims, 6 Drawing Sheets

(58) Field of Classification Search
USPC .......................................................... 320/165
See application file for complete search history.

(56) References Cited

U.S. PATENT DOCUMENTS

| | | | | |
|---|---|---|---|---|
| 2012/0112547 | A1* | 5/2012 | Ghosh ..................... | H02J 9/062 307/66 |
| 2014/0062542 | A1 | 3/2014 | Shi | |
| 2018/0076647 | A1* | 3/2018 | Wei ..................... | H02J 7/00306 |

FOREIGN PATENT DOCUMENTS

| | | | | |
|---|---|---|---|---|
| DE | 102013219965 | A1 * | 4/2015 | .............. B60L 58/12 |
| WO | 2014170409 | A1 | 10/2014 | |

OTHER PUBLICATIONS

International Search Report of PCT Patent Application No. PCT/IB2021/055797 issued on Oct. 18, 2021.

* cited by examiner

- - - → = control bus

- - - → = control bus

200

POWER SUPPLY APPARATUSES

FIELD

The present disclosure relates to power supply apparatuses, and more particularly to power supply apparatuses comprising a battery assembly which is configured for supplying stored power, and more particularly to battery-powered apparatuses including electrified vehicles and battery chargers for charging electrified vehicles or other heavy-duty loads.

BACKGROUND

Use of electrical energy to power vehicles and other mobile electrical loads has gained unprecedented popularity in recent years due to the world's urge to change over to green energies. Mobile electrical loads are typically powered by rechargeable batteries and rechargeable batteries form an integral of battery apparatuses which are configured for such purposes. A battery apparatus typically comprises a battery assembly which is configured to output operational powers. Battery apparatuses including electrified vehicles are gaining widespread popularity worldwide in recent years due to vast improvement in battery and drive technologies. With the widespread popularity of battery apparatuses, importance of peripheral equipment including charging equipment and apparatuses has become more apparent. The output requirements of a battery apparatus can differ significantly according to requirements and can be up to several tens of kilowatts.

SUMMARY

A power supply apparatus is disclosed. The power supply apparatus comprises a battery assembly, a power converter including an input node which is a converter input node on an input side and an output node which is a converter output node on an output side, a power input comprising a power input node which is configured for making electrical coupling with an external power supply, a power output comprising a power output node which is configured for making electrical coupling with a load which is an electrical load, a first switchable path interconnecting the battery assembly and the input node of the power converter, a second switchable path interconnecting the battery assembly and the output node of the power converter, and a third switchable path interconnecting the power input terminal and the input node of the power converter. The power converter is configured to provide an input path for passage of a charging current to charge the battery assembly when in a mode of operation, and to provide an output path for outputting stored energy of the battery assembly to a load connected to the power output when in another mode of operation.

A power supply apparatus comprising a power input, a power converter having an input side and an output side, a battery assembly, a switching arrangement, and a power output connected to the output side of the power converter is disclosed. The switch arrangement is operable to connect the battery assembly to the input side or to the output side of the power converter. The switch arrangement is configured to switch the apparatus to one of a plurality of connection states. The plurality of connection states includes a connection state in which the battery assembly is connected to the input side of the power converter and another connection state in which the battery assembly is connected to the output side of the power converter.

The power converter may be configured to output DC power.

The power converter may be configured to receive a first voltage at its input side and to output a second voltage at its output side, the second voltage being same or different to the first voltage.

The power conversion arrangement may comprise a second power converter. The second power converter be a DC-DC converter or a universal AC-DC converter.

A second power converter which is an AC-DC converter may be configured for connection to a mains power supply.

The battery assembly has a first output voltage range and the power converter may have a second output voltage range which is not identical to the first output voltage range.

The apparatus may comprise a controller which is configured to control the power converter to output a selected voltage dependent on voltage required at the power output.

The apparatus may comprise an input power coupler at the power input for making electrical coupling to an external power source and an output power coupler at the power output for making electrical coupling to an external load.

A power converter herein is a device which is configured to change or which is capable of changing at least one electrical property of an input power. The electrical property may be current, voltage, frequency. The power converter may be a standalone power converter, a cascade of power converters, or a plurality of power converters forming a cluster of power converters including standalone and cascaded power converters.

A power supply apparatus herein includes an apparatus which is capable of outputting stored energy of a built-in battery assembly, for example a battery-powered charger, electrified vehicles and other battery-powered apparatuses.

The plurality of connection states comprises a switching state which is a first switching state in which the switch arrangement is configured such that the battery assembly, the power converter and the power output are electrically connected so that the battery assembly is to output stored power through the power converter and the power output.

A method of operating a battery apparatus is disclosed. The apparatus comprises a power input, a power converter having an input side and an output side, a battery assembly, a switching arrangement, a controller, and a power output connected to the output side of the power converter, wherein the switch arrangement is configured to be operable to connect the battery assembly to the input side of the power converter for or to the output side of the power converter for battery charging. The method comprises the controller operating the switch arrangement to operate in one of a plurality of connection states, the plurality of connection states comprising a connection state which is a first connection state in which the battery assembly is connected to the input side of the power converter and in which the switch arrangement is configured such that the battery assembly, the power converter and the power output are electrically connected so that the battery assembly is to output stored power through the power converter and the power output; and another connection state which is a second connection state in which the battery assembly is connected to the output side of the power converter and the power input, the power converter and the power output are electrically connected such that the battery assembly is to be charged by power of an external power source connected to the power input.

The controller is configured to operate the switch arrangement to operate in the first connection state on demand for power output therefrom and to operate the switch arrangement to operate in the second connection state where there is no demand for power output therefrom.

BRIEF DESCRIPTION OF FIGURES

The present disclosure is made with reference to the accompanying figures, in which.

DESCRIPTION

Figure 1:
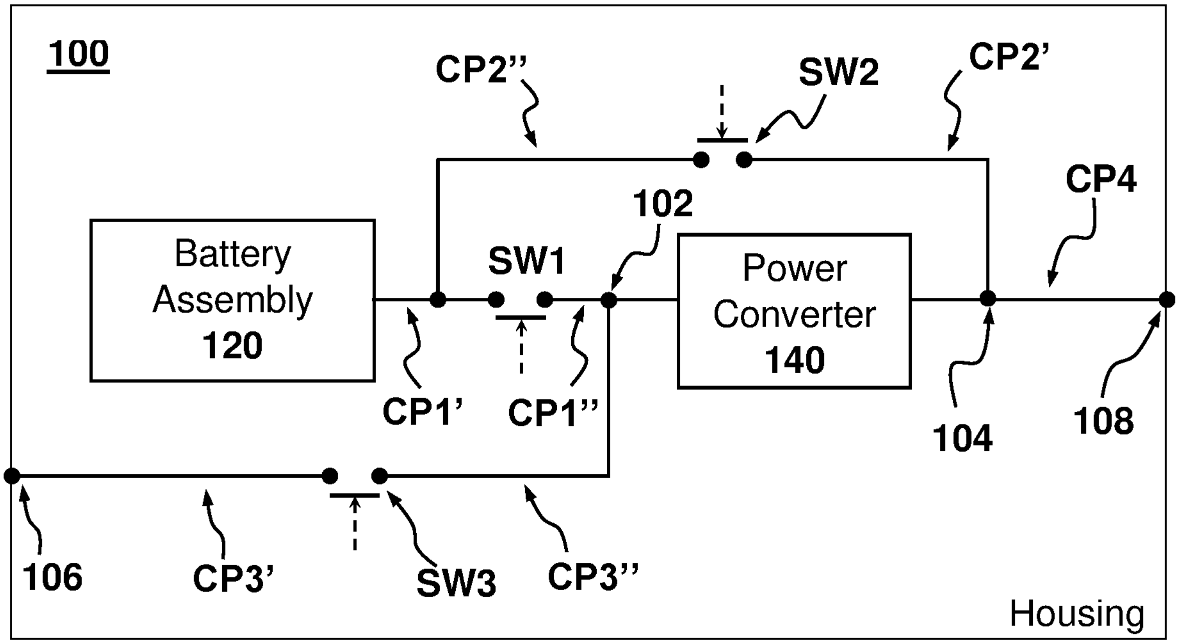
FIG. 1 is a block diagram of a battery apparatus 100 according to the present disclosure in one switching state.

A battery apparatus comprises a power input, a power output, a battery assembly, a switch arrangement and a power conversion arrangement. Power and energy herein respectively mean electrical power and electrical energy unless the context requires otherwise.

The switch arrangement comprises a plurality of power switches. A power switch herein may be a mechanical power switch, an electro-mechanical power switch, an electronic power switch. An electro-mechanical power switch may be a relay switch. An electronic power switch may be a field effect transistor (FET) switch such as a MOSFET power switch, a bipolar transistor power switch such as an IGBT switch, a thyristor switch, etc. A typical electronic power switch or a typical electro-mechanical power switch comprises a first node which may comprise a first contact terminal, a second node which may comprise a second contact terminal, a switchable current path interconnecting the first terminal and the second terminal, and a third node which is a control node configured to control switching of the switchable current path. The switchable current path is an internal current path of the power switch which is switchable between a first switching state which is an "ON" state in which the current path has a very low (i.e., near zero) impedance and a second switching state which is an "OFF" state in which the current path has a very high (i.e., near open circuit) impedance. The switch arrangement may comprise one type of power switches or different types of power switches according to implementation requirements such as power and switching speed requirements. The switches may be formed as a switch network comprising a plurality of switched forming a network. A node herein may be configured as a port or terminal for making electrical connections without loss of generality.

The power input is configured for coupling electrical power of an external power source into the apparatus and may comprise a power input node. The external power source may be an AC power source or a DC power source. The AC power source may be a power source which taps power from the power grid, for example, mains power supply. The power input node may be configured as a power coupler such as a power connector, for example, a detachable power connector comprising contact terminals for making electrical contact with an external power source.

The power output is configured for coupling energy of the apparatus to an external load and may comprise a power output node. Energy of the apparatus comprises energy stored in the battery assembly, and may also comprises energy of an external power source which is to transit through the apparatus, for example, after undergoing power conversion by the apparatus.

The external load is an electrical load which may be a chargeable load or a non-chargeable load. A chargeable load may comprise a battery assembly comprising a plurality of rechargeable batteries. The electrical load may be a stationary load or a mobile load. A stationary load may be a fixture such as an electrical appliance or a collection of electrical appliances of a building. A fixture may be, for example, wall-mounted, floor mounted or ceiling mounted. A mobile load may be, for example, an electrified car having a built-in battery assembly which functions as its sole or main power plant, or a battery-powered mobile apparatus which requires battery charging from time to time. An electrified vehicle (EV) herein refers to a vehicle which can be propelled by electricity. HEV (hybrid electric vehicles), PHEV (plug-in hybrid electric vehicles), BEV (battery electric vehicles) which have no back-up internal combustion engine, are examples of electrified vehicles.

The power output node may comprise a power coupler such as a power connector, for example, a detachable power connector comprising contact terminals for making mechanical coupling and electrical contact with an external load. A power coupler at the power output node may be configured as a standard-compliant power connector, for example, a power connector conforming to an EV standard such as the CHAdeMO standard, the CCS standard, the Type 1 standard, the Type 2 standard, and/or a standard which becomes available from time to time.

The battery assembly may comprise a single battery or a plurality of batteries. Each battery may have a single battery cell or a plurality of battery cells. Each battery may be configured as a prismatic battery, a cylindrical battery or a battery of any geometrical shape. The batteries may be connected in series and/or in parallel.

The power conversion arrangement may comprise a power converter or a plurality of power converters. A power converter is a power conversion apparatus which may be configured to converter voltage, current, polarity, phase and/or frequency of an input power. The power converters may be arranged in cascade or in parallel. A cascaded configuration of power converters would provide a higher power conversion ratio than is possible with a single power converter. A parallel configuration of power converters would provide a higher power output than is possible with a single converter. A power converter typically comprises a power input including an input node, a power output including an output node, and power conversion circuitry interconnecting the input and the output. The power output of the power converter is configured to output power of the apparatus to an external load via the power output node of the apparatus, and is electrically connected to the power conversion arrangement, which is in turn connected to the power input. The power converter may comprise a single input node or a plurality of input nodes, and a single output node or a plurality of output nodes.

An electrical path interconnects the battery assembly and the input of the power conversion arrangement. The electrical path, which is referred to as a first electrical path CP1 (or first path in short), is a switchable electrical path comprising a first current path portion CP1' which is connected to the battery assembly, a second current path portion CP1" which is connected to the input node 102 of the power converter 140, and a power switch SW1, which is referred to as a first power switch, interconnecting the first current path portion and the second current path portion, as shown in FIG. 1. The first path has an impedance which is determined by the switching state of the first power switch SW1. When the first power switch SW1 is in the ON state, the first path is in an ON state having a very low impedance state so that the battery assembly and the input of the power converter are electrically connected with a very low impedance current path. When the first power switch SW1 is in the OFF state, the first path is in an OFF state having a very high impedance state so that the battery assembly and the input of the power converter are practically in electrical isolation and have a very high interconnection impedance. The first path becomes a current path, which is a first current path, when the first power switch SW1 is switched on and remains in the ON state. The example power conversion arrangement of FIG. 1 comprises a single converter 140 as a convenient converters in a cascaded and/or parallel connection without loss of generality.

An electrical path interconnects the battery assembly and the output of the power conversion arrangement. The electrical path, which is referred to as a second electrical path CP2 (or second path in short), is a switchable electrical path comprising a first current path portion CP2' which is connected to the battery assembly, a second current path portion CP2" which is connected to the output port of the power converter 140, and a power switch SW2, which is referred to as a second power switch, interconnecting the first current path portion and the second current path portion. The second path has an impedance which is determined by the switching state of the second power switch SW2. When the second power switch SW2 is in the ON state, the second path is in an ON state having a very low impedance state so that the battery assembly and the output of the power converter are electrically connected with a very low interconnection impedance. When the second power switch SW2 is in the OFF state, the second path is in an OFF state having a very high impedance state so that the battery assembly and the output of the power converter are electrically isolated with a very high interconnection impedance. The second path becomes a current path, which is a second current path, when the second power switch SW2 is switched on and remains in the ON state. The first path CP1 and the second path CP2 are alternate current paths. The first switch SW1 and the second switch SW2 are always in opposite switching states so that current can flow in the first path or the second path, but not both, during normal operation of the apparatus.

An electrical path interconnects the power input and the input of the power conversion arrangement. The electrical path, which is referred to as a third electrical path CP3 (or third path in short), comprises a first current path portion CP3' which is connected to the power input node 106, a second current path portion CP3" which is connected to the input node 102 of the power converter 140, and a power switch, which is referred to as a third power switch SW3, interconnecting the first current path portion and the second current path portion. The third path has an impedance which is determined by the switching state of the third power switch SW3. When the third power switch SW3 is in the ON state, the third path is in a very low impedance state so that the power input and the input of the power converter are electrically connected with a very low interconnection impedance. When the third power switch SW3 is in the OFF state, the third path is in a very high impedance state so that the power input and the input of the power converter are electrically isolated with a very high interconnection impedance. The third path becomes a current path, which is a third current path, when the third power switch SW3 is switched on and remains in the ON state. The power input node 106 is configured to facilitate electrical connection with an external power supply. The apparatus includes a fourth path, which is a fourth current path CP4 interconnecting the converter output node 104 and the power output node 108. The second current path portion CP2" and the fourth current path CP4 are parallel current paths connected to a common node, namely, the converter output node.

Each one of the power switches, including switches SW1, SW2, SW3, comprises a first node which is connected to a first current path portion of an electrical path, a second node which is connected to the second current path portion of the electrical path, a switchable path interconnecting the first current path portion and the second current path portion, and a third port which is a control terminal for controlling the switching state of the power switch. The control port is connected to a controller, for example, the controller of an EMS (energy management system) via a control bus so that control signals can be transmitted from the controller to the power switch.

A power converter herein may be a transformer, an AC-DC converter, a DC-DC converter, or a combination of the aforesaid. The power converter may comprise a voltage converter, a current converter. The voltage converter is configured to receive a range of input voltage and may be configured to output a range of voltage. A power converter having a variable voltage input is advantageous since it is noted that the voltage of a battery changes as its state of charge (SoC) changes. A power converter having a variable voltage output is advantageous since the output voltage of the apparatus can be configured to suit different load voltage requirements.

The apparatus may comprise a controller which is configured to control operations of the apparatus, for example, to control output voltage and/or switching mode of the apparatus. The controller may be a digital controller, for example, a solid-state digital controller comprising a microprocessor, a cluster of solid-state processors, logic circuits configured as a logic array, or a cluster of logic arrays. The controller may be part of a system controller, for example, a part of an energy management system or a part of a battery management system (BMS).

The apparatus may include a main housing, as shown in FIG. 1. The main housing may be configured as a metal cabinet to provide weather shielding, enhance operational safety, and/or mobility.

The apparatus may be configured as a power supply apparatus to operate in one of a plurality of operation modes.

In an example operation mode, the switch arrangement is configured such that the battery assembly, the power converter and the power output are electrically connected so that the battery assembly is to output stored power through the power converter and the power output.

In an example operation mode, the switch arrangement is configured such that the power input, the power converter and the power output are electrically connected such that the battery assembly is to be charged by power of an external power source connected to the power input.

In an example operation mode, the switch arrangement is configured such that the power input, the power converter and the power output are electrically connected to output power of an external power source connected to the power input through the power output after power conversion by the power converter.

In an example operation mode, the switch arrangement is configured such that the power input and the battery assembly are electrically connected such that power of an external power source connected to the power input is to charge the battery assembly after power conversion by the power converter.

In an example operation mode, the switch arrangement is configured such that the power input, the battery assembly, and the power converter are electrically connected such that power of an external power source connected to the power input and stored power of the battery assembly are to be outputted through the power converter and the power output.

In an example operation mode, the switch arrangement is configured such that the battery assembly and the power converter are electrically connected such that power of an external power source connected to the power input and stored power of the battery assembly are to be outputted together through the power converter and the power output.

A battery apparatus herein means an apparatus having a battery assembly which is configured to provide operation power of the apparatus. A mobile apparatus herein comprises a mobile platform comprising a battery-driven motor drive unit, including an EV. The mobile platform may comprise wheels, tracks, caterpillar tracs or other mobility means which are driven by the motor drive unit to facilitate mobility of the apparatus, and the motor drive unit is powered by the battery assembly.

In an example operation mode, the switch arrangement is configured such that the battery assembly and the power converter are electrically connected to output stored power to operate the motor drive unit.

Each operation mode corresponds to a specific switching state and each specific switching state corresponds to a specific connection mode of the switch arrangement.

A typical BEV currently has a battery capacity in the range of between 17.6 kWh and 100 kWh and the capacity range is expected to change from time to time depending on distance range requirements and advancement in battery and drive technologies. An apparatus which is configured to charge a 100 kWh load in one hour (1 C charging) requires a charge power output of 100 kw while an apparatus which is to charge a 100 kWh load in ½ hour (2 C charging) requires a charge power output of 200 kW. The motor drive unit of a typical EV current has an input voltage requirement of between 400V and 800V. The CHAdeMO standard currently is configured to deliver up to 62.5 kW by 500V, 125 A DC and the revised CHAdeMO standard (2.0 standard) is to deliver up to 400 kW by 1000V, 400 A DC. The type 1 charging standard is configured for slow single phase AC charging at between 3.7 kW and 7.4 kW, while the type 2 charging standard is between 3.7 kW and 7 kW. The CCS (Combined Charging System or "Combo") is a modified and enhanced version of the Type 2 standard and is configured to output at 50 kW, to be increased to 350 kW in the future. A power converter having a power output rating of 10 kW and above is referred to as a high-power converter and the power electronics requirements are very different to those of low-power power converters.

The example apparatus comprises a universal AC-DC converter having an output power rating of 12.5 kW.

Each of the power switches SW1, SW2, SW3 is configured to be controlled by the controller. The controller is configured to apply control signals via a control bus to the third port of a power switch whereby its switching state is controlled or changed.

Figure 2:
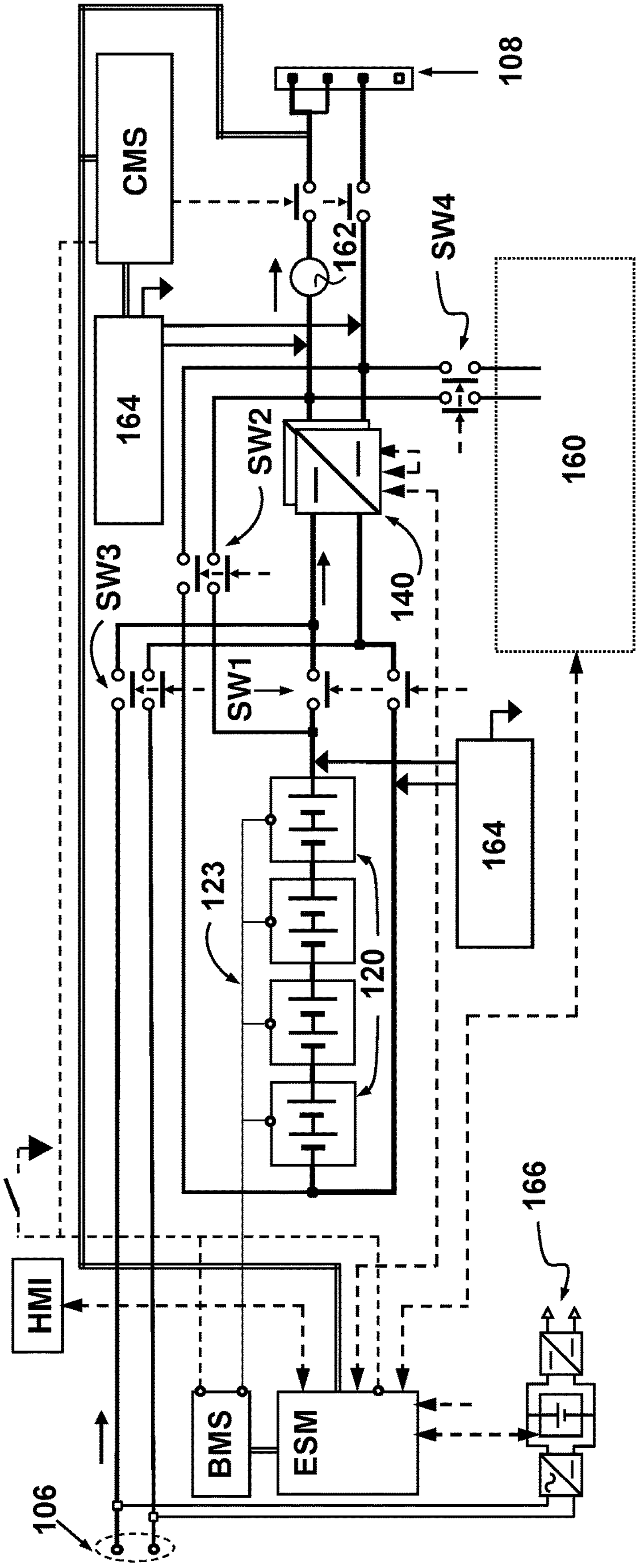
FIG. 2 is a block diagram of an example power supply apparatus 200 according to the present disclosure.
Figure 3:
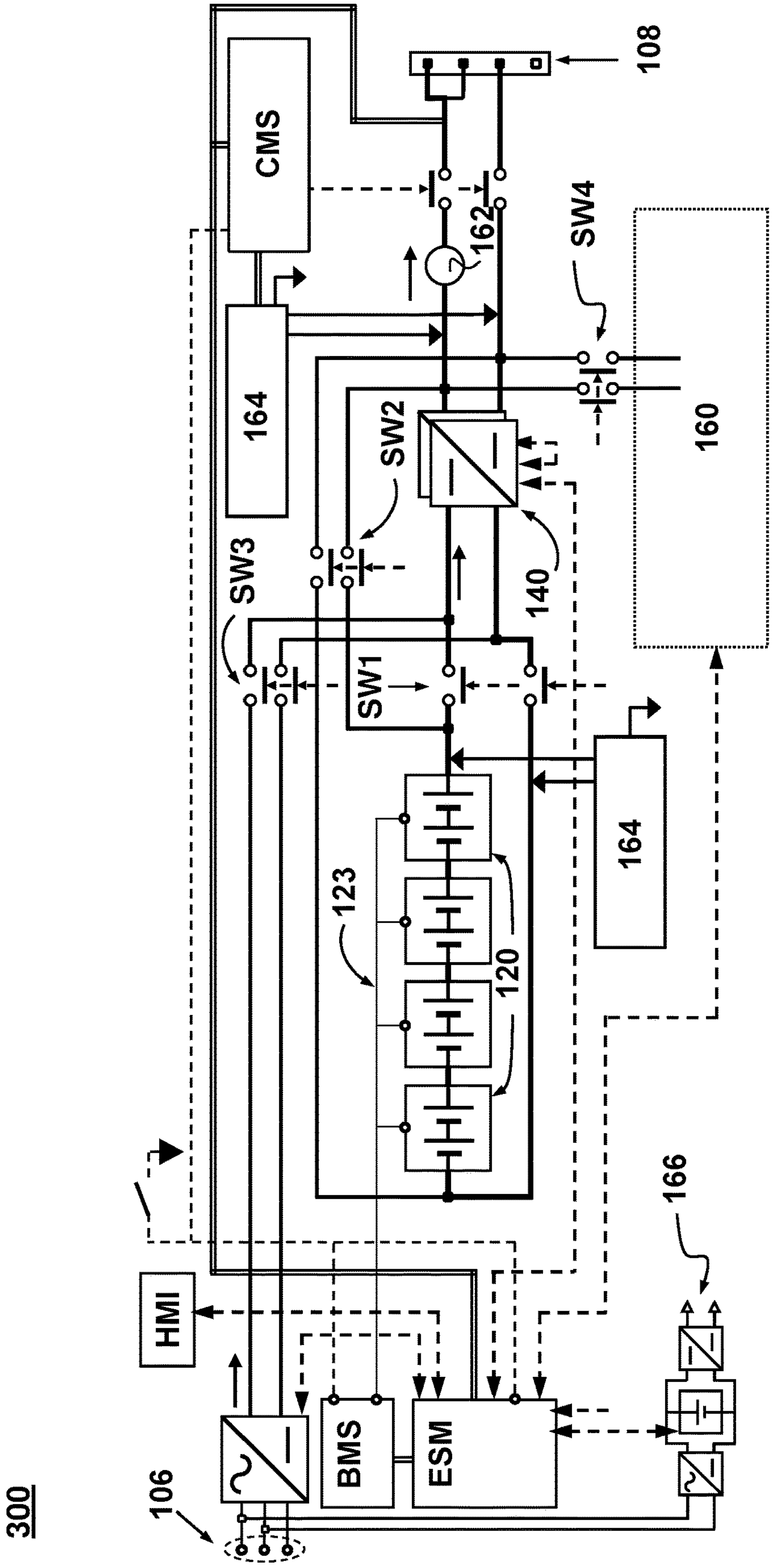
FIG. 3 is a block diagram of an example power supply apparatus 300 according to the present disclosure.

The battery apparatus may comprise peripheral circuits and devices, as shown in FIGS. 2 and 3. The peripheral circuits and devices may comprise a battery management system (BMS), an energy system manager (ESM), a human machine interface (HMI), a charging management system (CMS), a cooling arrangement, sensing and monitoring devices.

A BMS is configured to monitor parameters and conditions of the battery assembly. The parameters to be monitored may include voltage, state of charge (SoC), state of health (SoH), depth of discharge (DoD), temperature T, charging current, discharge current, etc. To facilitate battery management, for example, monitoring of battery parameters and battery operations control, the apparatus may comprise a data bus and/or a control bus to interconnect the battery assembly and the BMS. Likewise, the apparatus may comprise a data bus and/or a control bus to interconnect the power converter and the ESM controller.

A battery cell typically has a maximum working voltage ($V_{cell\_max}$ or maximum voltage in short), a minimum working voltage ($V_{cell\_min}$ or minimum voltage in short), and a nominal voltage ($V_{cell}$). A battery assembly comprising a plurality of battery cells arranged in n cells in series and p cells in parallel connection, represented as an nSmP battery assembly, has a voltage of $nV_{cell}$ and a stored energy of $n \times m \times E_{cell}$, where $E_{cell}$ is the energy storage capacity of a cell. A battery assembly has a useable energy capacity of E kwh which is the difference between the maximum stored energy of $E_{max}$ at $V_{max}$ and the minimum stored energy of $E_{min}$ at $V_{min}$, where $V_{max}$ and $V_{min}$ are, respectively, the maximum working voltage and the minimum working voltage of the battery assembly. SoC is expressed in percentage terms of the maximum stored energy of a battery assembly and a battery assembly at $E_{max}$ has an SoC of 100%.

A battery has a rated capacity ($C_{rated}$) and a fully charged battery has the maximal releasable capacity ($C_{max}$), which can be different from the rated capacity. In general, $C_{max}$ is to some extent different from C rate d for a newly used battery and will decline with the time of use. It can be used for evaluating the SOH of a battery, which can be expressed as $SOH=C_{rated}/C_{max}$ in percentage term. When a battery is discharging, the depth of discharge (DOD) can be expressed as the percentage of the capacity that has been discharged related to the rated capacity, that is, $DoD=C_{released}/C_{rated}$ in percentage term.

The SoC and SoH of a battery assembly can be determined by the BMS with reference to charging current, charging voltage, charging time of the battery assembly. The DoD of a battery assembly can be determined by the BMS with reference to discharging current, discharging voltage, discharging time of the battery assembly. To facilitate monitoring of battery conditions, voltage, current and temperature sensors are included.

An ESM is configured to control and monitor energy operations of the apparatus. The apparatus comprises control buses, for example, bidirectional data buses such as RS 485 buses. The power switches are connected to the ESM by control buses. The ESM may be configured to provide options for selection by a user. The options may include, for example, a) mode of charging, b) time of charging, c) capacity of charging. The modes of operation may include i) a slow charging mode with charging power coming from an external power source, ii) a fast-charging mode with charging power coming from the battery-assembly only, iii) a super-fast charging mode.

An HMI is configured to facilitate interaction between a user and the apparatus. The HMI may comprise a user interface such as a touch-panel display so that a user may select a mode of operation of the apparatus. The HMI is data-connected to the ESM, for example, by a bidirectional data bus such as an RS485 bus, so that a user can interact with the ESM and responses of the ESM are displayed.

Figure 1A:
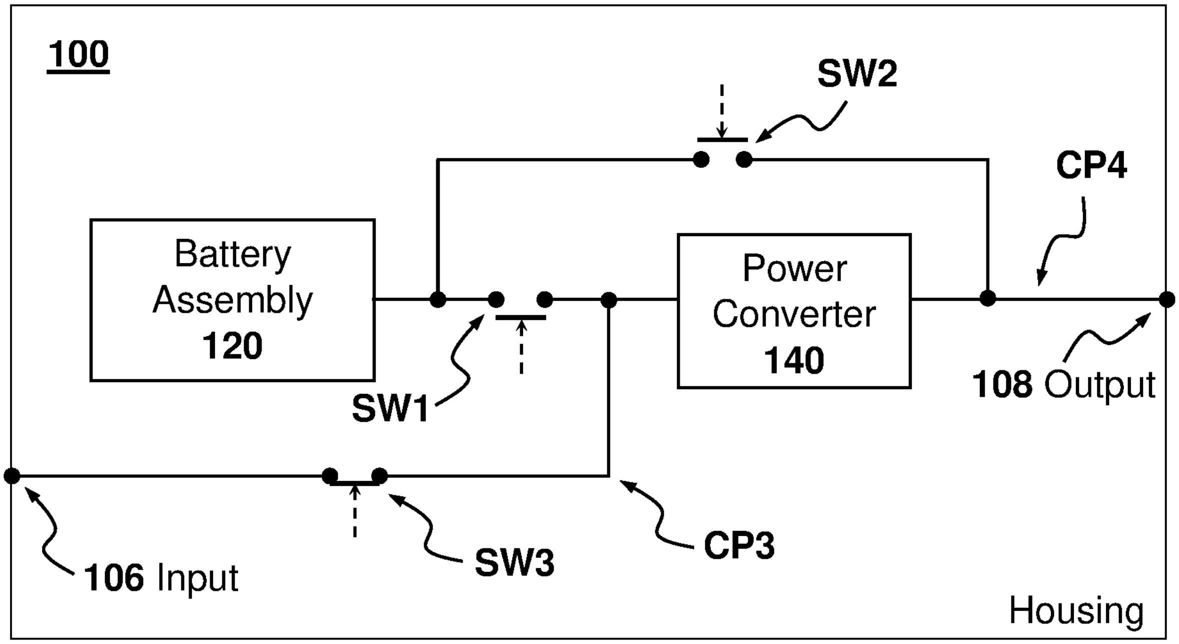
FIG. 1A is a block diagram of the battery apparatus of FIG. 1 in another switching state.

In an example mode of operation, a user operates the HMI to elect a slow-charging mode. The ESM on detecting the request and due authorization will commence the slow charging mode operations by closing the power switch SW3 and opening the power switches SW1 and SW2. When the power switch SW3 is closed and the switches SW1 and SW2 are opened, the third path CP3 is switched into a very low impedance state (or a highly conductive state) and the first CP1 and second CP2 paths are in a very high impedance state so that external power can be delivered to the power output 108 via the power converter 140, the third path CP3 and a fourth current path CP4, as shown in FIG. 1A.

Figure 1B:
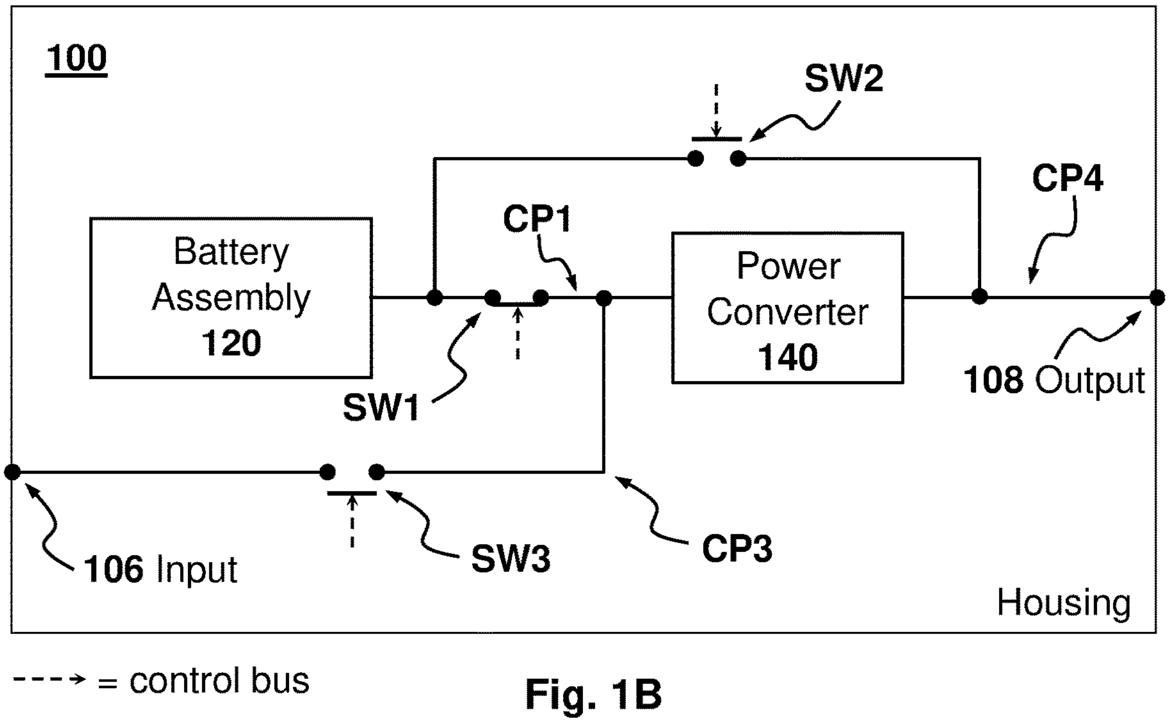
FIG. 1B is a block diagram of the battery apparatus of FIG. 1 in another switching state.

In an example mode of operation, a user operates the HMI to elect a fast-charging mode. The ESM on detecting the request and due authorization will commence the fast charging mode operations by closing the power switch SW1 and opening the power switches SW2 and SW3. When the power switch SW1 is closed and the switches SW2 and SW3 are opened, the first path CP1 is switched into a very low impedance state (or a highly conductive state) and the second CP2 and third CP3 paths are in a very high impedance state so that stored power of the battery assembly can be delivered to the power output 108 via the power converter 140, the first path CP1 and the fourth current path CP4, as shown in FIG. 1B.

Figure 1C:
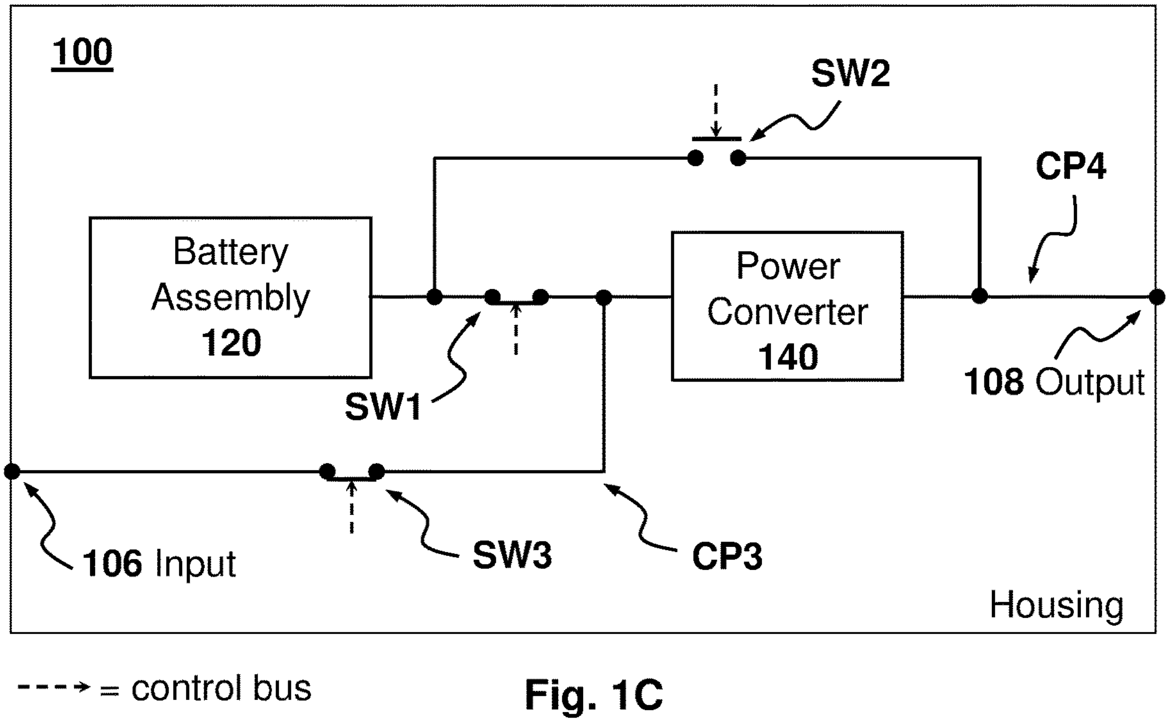
FIG. 1C is a block diagram of the battery apparatus of FIG. 1 in another switching state.

In an example mode of operation, a user operates the HMI to elect a super-fast charging mode. The ESM on detecting the request and due authorization will commence the super-fast charging mode operations by closing the power switch SW1 and SW3 while opening the power switches SW2. When the power switches SW1 and SW3 are closed and the power switch SW2 opened, the first path CP1 and the third path CP3 are switched into a very low impedance state (or a highly conductive state) and the second path CP2 is in a very high impedance state so that stored power of the battery assembly and the external power at the Input can be delivered to the power output 108 via the power converter 140 and the first CP1 and third CP3 paths, as shown in FIG. 1C.

Figure 1D:
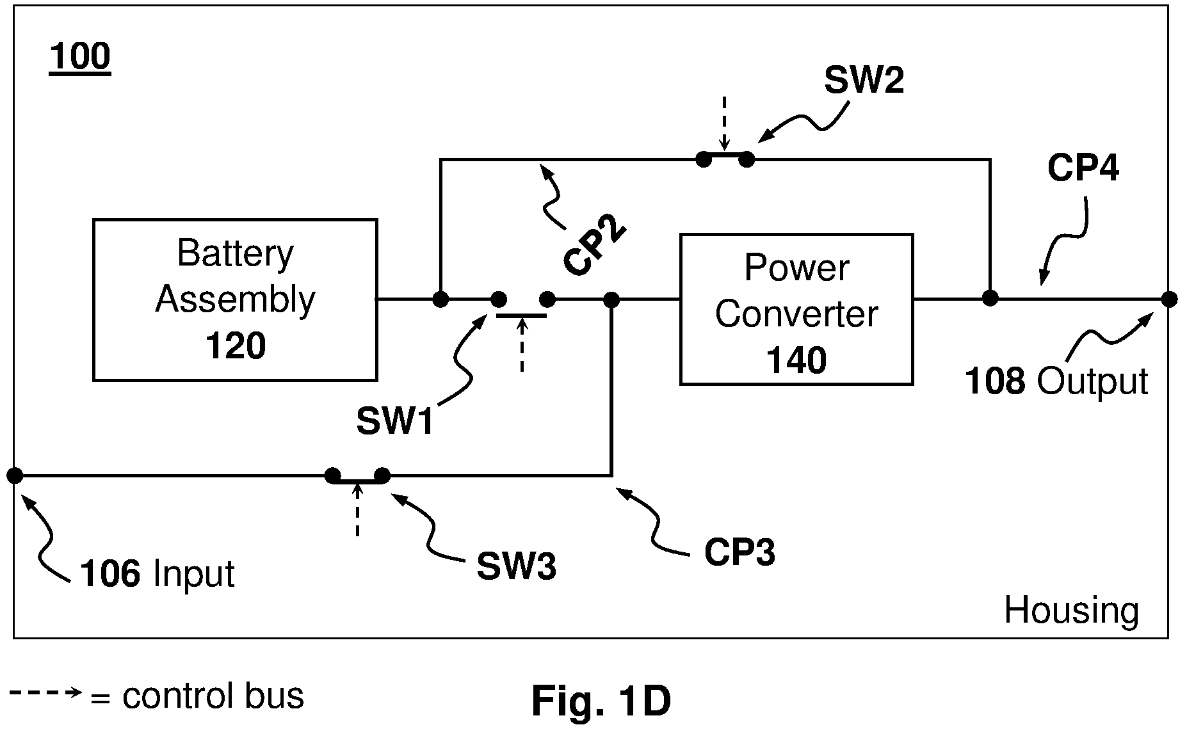
FIG. 1D is a block diagram of the battery apparatus of FIG. 1 in another switching state.

When the apparatus is an idling mode, that is, not in power output operations, the controller may control the apparatus to enter in a mode of battery-charging operation such that the power switches SW2 and SW3 are closed while the power switch SW1 is open. When in this mode of operation, the external power at the Input will be used to charge the battery assembly only. The controller may be configured to control the apparatus to enter this operation mode during a period when power output request is not expected and when the SoC of the battery module corresponds to a state that requires or is suitable for charging, as shown in FIG. 1D.

In another idling mode, the power switches SW1, SW2 and SW3 are all opened so that there is no battery charging or power output. The controller may be configured to control the apparatus to enter this operation mode when the battery module is fully charged and there is no request for power output, as shown in FIG. 1.

An example power supply apparatus 200 comprising a battery apparatus of the present disclosure is shown in FIG. 2. The power supply apparatus 200 comprises a controller, peripheral circuitries, and the battery apparatus 100. The controller comprises a plurality of control modules or components, including a BMS, an ESM, an HMI and a CMS. The control modules or components are interconnected by a plurality of data buses and control buses (shown in dotted lines). A data bus and/or a control bus 123 interconnects the battery assembly and the BMS. The data bus is configured to transmit instantaneous battery parameters, for example, voltage, current, temperature, pressure, to the BMS and the BMS is configured to send control signals to the battery assembly, for example, activating a fan or a selected plurality of fans, isolating a battery or a battery module on detection of battery abnormalities. The example switches SW1, SW2, SW3 and SW4 are double-throw switches so that both the forward and return paths of an electrical circuit are turned on when the switch is switched on or turned off when the switch is switched off. The peripheral circuitries may comprise insulation sensors 164 to enhance battery safety.

An example power supply apparatus 300 comprising a battery apparatus of the present disclosure is shown in FIG. 3. The power supply apparatus 300 has a configuration which is identical to that of the supply apparatus 200, except that an AC-DC converter is disposed at the power input 106 so that an incoming alternating current is converted into a DC current prior to passing through the third switch SW3. The battery apparatus 100 of the present disclosure is incorporated as a core element of the power supply apparatus 200, 300, and reference numerals of the battery apparatus 100 are incorporated into the figures and description of the power supply apparatus 200, 300 by reference.

Each one of the apparatus 200, 300 comprises an example battery assembly having an example plurality of four serially-connected battery modules. Each battery module has n serially-connected groups of battery cells, with each group having P cells connected in parallel to form an nSmP configuration. The example battery module is assembled from an example plurality of n=28 and m=9 Lithium-ion rechargeable battery cells to form a battery module having a 28S9P configuration. The battery cell may be an 18650-sized cylindrical Lithium-ion cell. An example 18650-sized cylindrical Lithium-ion cell has a cell nominal voltage $V_{cell\ nominal}$ of 3.6V, a rated voltage range of between 2.5V ($V_{cell\ min}$) and 4.1V ($V_{cell\ max}$) and a current rating of 2.55 Ah. The 252 pieces of 18650 battery cells of the battery module are assembled to form a battery module having a rated voltage of 100.8V, a voltage range of between 70V ($nV_{cell\ min}$) and 114.8V ($nV_{cell\ max}$) a maximum discharge current of 100 A, a rated stored energy capacity of 2.3 kWh and a de-rated stored energy capacity 2.0 kWh. The four battery modules are assembled to form a battery assembly having a rated voltage of 403.2V, a rated stored energy capacity of 9.2 kWh and a de-rated stored energy capacity 8.0 kWh.

An example external source is a mains single-phase AC power supply having a rated power of 2.8 kW at 220V and 13 A.

The example power converter of the apparatus 200 is a universal AC-DC converter having a power rating of 12.5 kW. This power rating is required to handle the maximum power requirements of the apparatus, for example, when outputting in the super-fast mode during which both stored-energy output of the battery assembly and power of the external power supply are being output.

The example power converter of the apparatus 300 is an ensemble of power converters comprising two DC-DC converters which are connected in parallel to provide a power rating of 28 kW. The apparatus 300 comprises an AC-DC converter which interconnects the Input of the apparatus and the ensemble of DC-DC converters. The AC-DC converter has an input port which is connected to the Input of the apparatus and an output port which is connected to the input of the ensemble of DC-DC converters. The example AC-DC converter is a second power converter which is configured to convert the input power of the external power source to a DC output power, which is 400V at 6.8 A in this example. The power switch SW3 interconnects the DC-DC converter and the AC-DC converter. The DC-DC converter is a first power converter while the AC-DC converter is a second power converter of the apparatus 300.

In examples where the apparatus is a mobile apparatus having a mobile platform and a motor drive unit 160 configured to drive the mobile platform, the apparatus may operate in a mobile mode. When in the mobile mode, power to operate the motor drive may come from the battery assembly in which case the switch SW1 and a power switch SW4 are closed so that motor-driving power can be supplied by the battery assembly to the motor drive unit. The mobile apparatus may have a stand-alone stored power supply dedicated to operate the motor drive unit so that there is no need to tap power from the battery assembly 120 unless the dedicated power supply has exhausted. The motor drive unit may be connected to the EMS so that operation power of the motor is controlled by the EMS.

In example embodiments, the BMS and the EMS share a controller so that the apparatus is controlled by a common controller which is a main controller. In some embodiments, the BMS and the EMS have separate controllers and the apparatus is controlled by distributed controllers.

The apparatus may comprise a current sensor or a plurality of current sensors. A current sensor 162 may be disposed to monitor current output status of the current path CP4 so that the current being output to the output 104 can be real time monitored. The current sensor may be connected to the EMS so that the instantaneous current flowing through the current path CP4 can be determined.

The apparatus may comprise an insulation sensor or a plurality of insulation sensors. The insulation sensor 164 or sensors may be deployed to monitor the insulation states of the battery module and/or the current paths to mitigate safety hazards. The insulation sensor(s) may be connected to the BMS and/or the EMS.

The apparatus may comprise a charging manager which is configured to perform charging according to established standards, for example, according to the CCS, CHAdeMO, GB standards. The charging manager is part of and is controlled by the ESM.

The apparatus may comprise a cooling arrangement 166 which is configured to cool the apparatus during power operations. The cooling arrangement 166 may comprise an array of fans which is configured to move air in and out of the apparatus to maintain the operation temperature of the apparatus, especially the temperature of the battery assembly.

While the apparatus has been described with reference to the figures and embodiments, persons skilled in the art would appreciate that the disclosure herein is not intended to be limiting.

Figure 4:
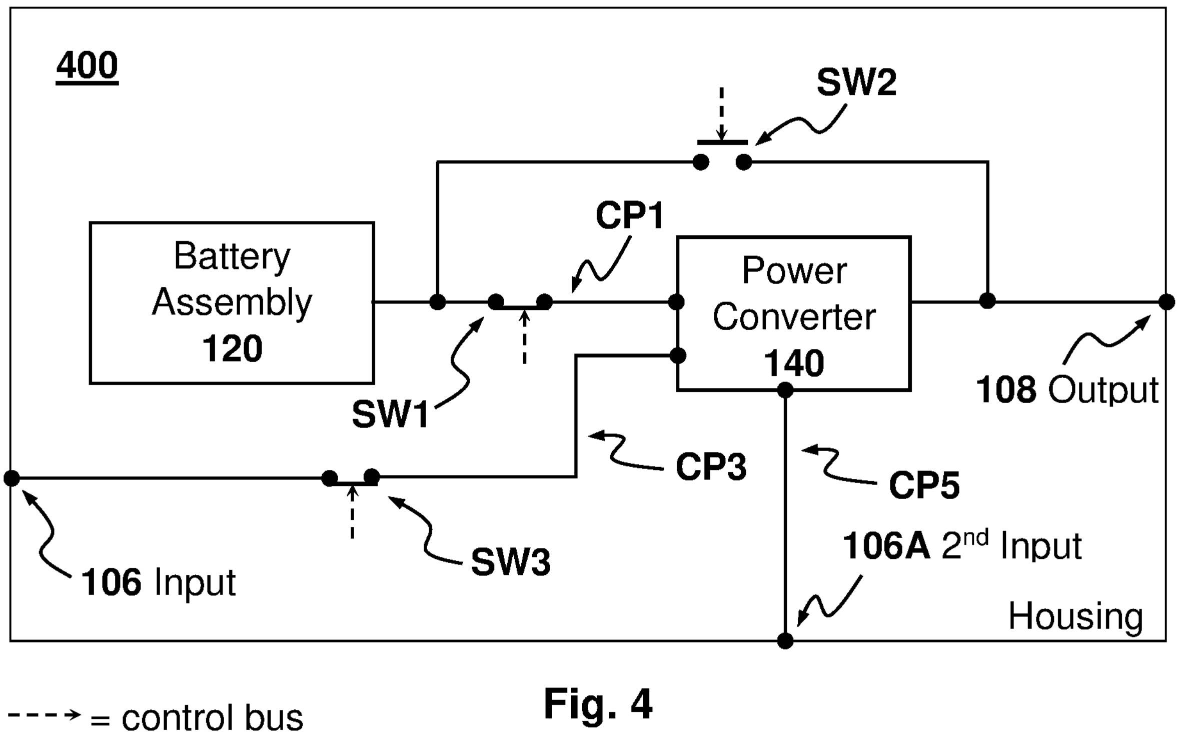
FIG. 4 is a block diagram of an example battery apparatus 400 according to the present disclosure.

For example, the apparatus 100, 200, 300 may be modified to become the apparatus 400 of FIG. 4. Referring to FIG. 4, the apparatus 400 comprises an additional power input port 106A which is configured to receive input power from another external power source. The external power source may be another one of apparatus 100, 200, 300, 400, or another main power supply. The apparatus 400 may comprise the features of the apparatus 100, 200, 300, 400 and the descriptions in relation thereto are incorporated into the apparatus 400 by reference where appropriate. The apparatus 400 comprises a current path CP5 which interconnects the power input port 106A and the input of the power converter 140 so that the additional input power can be fed into the apparatus 400. The input power from that another external power may be combined with the stored power from the battery assembly 120, power from the input 106 for maximal output at the power output 108. When in the maximal output configuration, the switch SW2 is open, while the switches SW1 and SW3 are closed. In the configuration of FIG. 4, the current paths CP1 and CP3 are shown terminated at different input ports of the power converter 140 and the same termination configuration may apply to the apparatus 100, 200, 300 without loss of generality. The apparatus 100, 200, 300, 400 may comprise a secondary power output port which is configured for secondary power output. The second power output port may be connected to a secondary output port which is connected to the output side of the power converter 140.

A plurality of apparatuses 100, 200, 300, 400 may be connected to form an array or an ensemble of battery apparatuses to form a power supply arrangement of the present disclosure. The apparatuses 100, 200, 300, 400 may be interconnected such that the secondary input port 106A of one apparatus is connected to the primary power output port 104 or the secondary power output port of another apparatus. When a plurality of apparatuses 100, 200, 300, 400 is connected to form an array or an ensemble, the stored energy of one apparatus 100, 200, 300, 400 can be output to another apparatus 100, 200, 300, 400 for combined or boosted output.

The invention claimed is:

1. A power supply apparatus comprising:

a battery assembly, a power converter including an input node which is a converter input node on an input side and an output node which is a converter output node on an output side, a power input comprising a power input node which is configured for making electrical coupling with an external power supply, a power output comprising a power output node which is configured for making electrical coupling with a load which is an electrical load, a first switchable path interconnecting the battery assembly and the input node of the power converter, a second switchable path interconnecting the battery assembly and the output node of the power converter, a third switchable path interconnecting the power input terminal and the input node of the power converter, a switch arrangement operable to switch the first switchable path, the second switchable path and the third switchable path into one of a plurality of connection states, and peripheral circuits and devices including an HMI which is a human machine interface, a BMS which is a battery management system, and an EMS controller which is a controller of an energy management system configured to control and monitor energy operations of the apparatus; and wherein the HMI is configured to allow a user to request for a mode of operation and the EMS controller on detecting the request and due authorization is to commence a mode of operation by operating the switch arrangement to set the first switchable path, the second switchable path and the third switchable path into a connection state of the plurality of connection states.

2. The power supply apparatus of claim 1, wherein the plurality of connection states includes a connection state corresponding to a slow-charging mode in which:

the first switchable path and the second switchable path are turned off, and the third switchable path is turned off;

so that only power of the external power supply is delivered to the power output via the power converter.

3. The power supply apparatus of claim 1, wherein the plurality of connection states includes a connection state corresponding to a fast-charging mode in which:

the first switchable path is turned on, and the second switchable path and the third switchable path are turned off;

so that only stored power of the battery assembly is delivered to the power output via the power converter.

4. The power supply apparatus of claim 1, wherein the plurality of connection states includes a connection state corresponding to a superfast-charging mode, in which:

the first switchable path and the third switchable path are turned on, the second switchable path is turned off;

so that stored power of the battery assembly and power of the external power supply are delivered to the power output via the first switchable path CP1, the third switchable path CP3, and the power converter.

5. The power supply apparatus of claim 1, wherein the plurality of connection states includes a connection state corresponding to a battery-charging mode, in which:

the second switchable path and the third switchable path are turned on, and the first switchable path is turned off; and so that the battery assembly is charged by power of the external power supply with no power output to the load.

6. The power supply apparatus of claim 5, wherein the apparatus is to operate in the battery-charging mode:

when the apparatus is in an idling state with no power output operations, and when the SoC of the battery module corresponds to a state that requires or is suitable for charging.

7. The power supply apparatus of claim 1, wherein the peripheral circuits and devices include a BMS which is a battery management system, wherein the BMS is configured to monitor parameters and conditions of the battery assembly including SoC which is state of charge, and (US [0055])

wherein the BMS and the battery assembly is interconnected by a data bus or a control bus.

8. The power supply apparatus of claim 1, wherein the ESM and the HMI are data connected by a bidirectional data bus.

9. The power supply apparatus of claim 1, wherein the ESM is configured to provide options for selection by a user, and wherein the options include:

mode of charging, time of charging, and capacity of charging.

10. The power supply apparatus of claim 1, wherein the HMI comprises a user interface for a user to select a mode of operation from a plurality of modes of operation, wherein the modes of operation include:

a slow charging mode with charging power coming from the external power supply, a fast-charging mode with charging power coming from the battery-assembly only, a super-fast charging mode with charging power coming from the battery-assembly and the external power supply.

11. The power supply apparatus of claim 1, wherein each of the first switchable path, the second switchable path and the third switchable path is a switchable current path.

12. The power supply apparatus of claim 1, wherein the apparatus comprises a fourth current path which interconnects the converter output node and the power output node, and wherein the second switchable path and the fourth current are current paths connected to a common node which is the converter output node.

13. The power supply apparatus of claim 1, wherein the apparatus comprises a metal cabinet to provide weather shielding, enhance operational safety, and/or mobility.

14. The power supply apparatus of claim 1, wherein the apparatus comprises an EV-standard compliant power coupler.

15. The power supply apparatus of claim 1, wherein the apparatus is a mobile apparatus having a mobile platform and a motor drive unit configured to drive the mobile platform, so that the apparatus is operable in a mobile mode.

16. The power supply apparatus of claim 15, wherein the motor drive unit is to obtain motor-driving power from the battery assembly or from a standalone battery when operating in the mobile mode.

17. A method of operating a power supply apparatus, the power supply apparatus comprising:

a battery assembly, a power converter including an input node which is a converter input node on an input side and an output node which is a converter output node on an output side, a power input comprising a power input node which is configured for making electrical coupling with an external power supply, a power output comprising a power output node which is configured for making electrical coupling with a load which is an electrical load, a first switchable path interconnecting the battery assembly and the input node of the power converter, a second switchable path interconnecting the battery assembly and the output node of the power converter, a third switchable path interconnecting the power input terminal and the input node of the power converter, a switch arrangement operable to switch the first switchable path, the second switchable path and the third switchable path into one of a plurality of connection states, and peripheral circuits and devices including an HMI which is a human machine interface, a BMS which is a battery management system, and an EMS controller which is a controller of an energy management system configured to control and monitor energy operations of the apparatus;

wherein the HMI is configured to allow a user to request for a mode of operation and the EMS controller on detecting the request and due authorization is to commence a mode of operation by operating the switch arrangement to set the first switchable path, the second switchable path and the third switchable path into a connection state of the plurality of connection states;

wherein the method comprises selective switching of the first switchable path, the second switchable path and the third switchable path by the EMS controller to enter into a user-selected charging mode.

18. The method of claim 17, wherein the plurality of connection states includes a connection state corresponding to a slow-charging mode in which:

the first switchable path and the second switchable path are turned off, and the third switchable path is turned off; and wherein the method comprises the EMS controller switching the apparatus into the connection state corresponding to the slow-charging mode so that only power of the external power supply is delivered to the power output via the power converter.

19. The method of claim 17, wherein the plurality of connection states includes a connection state corresponding to a fast-charging mode in which:

the first switchable path is turned on, and the second switchable path and the third switchable path are turned off; and wherein the method comprises the EMS controller switching the apparatus into the connection state corresponding to the fast-charging mode so that only stored power of the battery assembly is delivered to the power output via the power converter.

20. The method of claim 17, wherein the plurality of connection states includes a connection state corresponding to a superfast-charging mode, in which:

the first switchable path and the third switchable path are turned on, the second switchable path is turned off; and wherein the method comprises the EMS controller switching the apparatus into the connection state corresponding to the superfast-charging mode so that stored power of the battery assembly and power of the external power supply are delivered to the power output via the first switchable path CP1, the third switchable path CP3, and the power converter.

* * * * *